US006912583B2

(12) United States Patent
Hollander

(10) Patent No.: US 6,912,583 B2
(45) Date of Patent: Jun. 28, 2005

(54) CONTROL OF AN INFORMATION FLOW IN A DIGITAL NETWORK

(75) Inventor: Jonas Hollander, Växjö (SE)

(73) Assignee: Tradedoubler AB, Stockholm (SE)

( * ) Notice: Subject to any disclaimer, the term of this patent is extended or adjusted under 35 U.S.C. 154(b) by 643 days.

(21) Appl. No.: 09/947,566

(22) Filed: Sep. 7, 2001

(65) Prior Publication Data

US 2002/0029379 A1 Mar. 7, 2002

Related U.S. Application Data

(60) Provisional application No. 60/231,320, filed on Sep. 8, 2000.

(30) Foreign Application Priority Data

Sep. 7, 2000 (SE) .............................. 0003166

(51) Int. Cl.$^7$ ............................................ G06F 15/16
(52) U.S. Cl. ...................... 709/229; 709/203; 709/224; 709/225; 709/226
(58) Field of Search ........................ 709/203, 217–219, 709/223–229; 719/310

(56) References Cited

U.S. PATENT DOCUMENTS 6,003,076 A * 12/1999 Maruyama et al. ......... 709/223
6,173,322 B1 * 1/2001 Hu ............................. 709/224
6,189,032 B1 * 2/2001 Susaki et al. ............... 709/225
6,629,146 B1 * 9/2003 Mohri ........................ 709/232

OTHER PUBLICATIONS

Wolisz et al. "Service provider selection in an open services environment" 1990 IEEE, pp. 229–235.*
Zegura et al. "Application–layer anycasting: a server selection architecture and use in a replicated web server" 2000 IEEE, pp. 455–466.*

* cited by examiner

Primary Examiner—Meng-Al T. An
Assistant Examiner—Van H. Nguyen
(74) Attorney, Agent, or Firm—Burns, Doane, Swecker & Mathis, LLP

(57) ABSTRACT

Information flow is controlled in a digital network by providing a control server that is linked to server units in the digital network by means of instructions stored in the server units. When predetermined conditions are satisfied, a first server unit being visited by a user sends an instruction to the user, which causes the user to send information to the control server. Based on the information, conditions for renewing contact with the control server are sent back to the user. When these conditions are satisfied, contact with the control server is renewed, and the control server selects a second server unit and sends an instruction that enables the user to visit a web site served by the second server unit. The second server unit preferably includes information related to information included at the first server unit.

19 Claims, 2 Drawing Sheets

CONTROL OF AN INFORMATION FLOW IN A DIGITAL NETWORK

CROSS REFERENCE TO RELATED APPLICATIONS

This application claims the benefit under 35 U.S.C. § 119(e) of U.S. Provisional Application No. 60/231,320, filed Sep. 8, 2000, which is hereby incorporated herein by reference in its entirety. The Provisional Application was originally filed in the Swedish language, and an accurate verified English translation of the same was filed on Dec. 26, 2000.

BACKGROUND

The present invention relates to a method of controlling an information flow in a digital network that comprises a plurality of server units, which for information exchange are visitable by at least one user computer that is connected to the network and has a program that controls the contact with the server units of the network. A memory in the computer stores information fetched from the server units, which information may be retrieved, for example, for the purpose of being shown on a display connected to the user computer.

Information exchange on a digital network, such as the Internet, is well known. On the Internet, the user computers are generally so-called personal computers, which are well known to those skilled in the art and thus will not be described in more detail. Programs which are used in these computers for controlling contact with the Internet are often called browsers and likewise do not need any further presentation to those skilled in the art.

A distinguishing characteristic of the Internet is that the information accessible to the user computers is arranged in a disorderly manner and is therefore difficult for an inexperienced computer user to find. Moreover, the Internet is distinguished in that it may be difficult for individual net addresses or web sites to assert themselves in relation to other net addresses or web sites. As a consequence, the information which is accessible at these places may get lost in the large amounts of information.

SUMMARY

In light of the above, an object of the invention is to make it easier for a computer user, who in the following should be considered as included in the expression "user computer", to find the information searched for in a computer network.

Another object of the invention is to make it easier for a server unit in the network to reach out with its information to user computers searching for the type of information that is provided by the server unit.

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in a method comprising the steps of providing a control server, to which some of the server units are linked via the network by storing a first instruction in them, which first instruction contains conditions for contacting the control server. A server unit which is visited by a user computer and linked to the control server sends a second instruction to the user computer when the conditions for contacting are satisfied, which second instruction contains information intended for the control server and causes the user computer to contact the control server for sending the information to the same. The control server sends a third instruction to the user computer, which third instruction contains conditions for renewed contacting of the control server. The third instruction causes the user computer, when said conditions for renewed contacting of the control server are satisfied, to send a request to the control server to control the information flow. The control server sends a fourth instruction to the user computer in response to this request when predetermined conditions are satisfied, which fourth instruction causes the user computer to contact, for information exchange, a server unit selected by the control server according to fixed rules. The user computer fetches information from this selected server unit and stores the information in the memory to show the same on its display.

By providing a control server, which has contact with both a server unit, which is visited by a user computer, and several other server units included in the network, it will, if the server units are combined into units or clusters which are related as to information content, be possible to offer in a reliable manner another information alternative to the user computer, if the user computer rejects a previous alternative or has made a choice which indicates an interest within the field of information offered by another server unit connected to the control server. Similarly, it is, of course, also possible under corresponding conditions for the server units which are connected to the control server to use the control server to spread their information content, in competition with only a few other server units and according to fixed rules, to a user computer in search of such information.

As a first alternative, the condition that the user computer interrupts in an undesirable manner the contact with a visited server unit is, as a condition for contacting the control server, integrated in the first instruction. This first alternative is particularly usable when the user computer has searched in vain for information in a server unit, which is indicated by the server unit being left without the user computer having in any way used the offered information, for instance, by placing an order.

As a second alternative, the condition that the user computer interrupts in a desirable manner the contact with a visited server unit is, as a condition for contacting the control server, integrated in the first instruction. This second alternative is particularly usable when the user computer takes an interest in related information after having found the information originally searched for, which is indicated by the server unit being left after the offered information has been used by the user computer, for instance, by the user computer having placed an order with the server unit.

In an aspect of the invention, address information about the visited server unit is preferably integrated in the information which is included in the second instruction. It will be understood that such address information facilitates the handling in the control server when the latter is to find an alternative server unit for the user computer among the connected server units.

Although not an essential feature of the invention, as a condition for renewed contacting of the control server, the third instruction preferably includes a time condition that inhibits renewed contacting of the control server for a predetermined time. The purpose of this condition is in particular to avoid a user computer being unnecessarily often offered information from different alternative server units.

Preferably, information fetched from the second instruction about the behavior of the user computer in the visited server unit is integrated in the request to control the information flow. Also this solution aims at facilitating the handling and results in the control server directly having necessary decision data for the further control of the information flow.

In some embodiments, suitably integrated in the rules is the condition that a server unit linked to the control server is, at most, selected as often as it causes the sending of a request to control the information flow to the control server. This solution aims in particular at achieving equity between the server units which are connected to the control server, thus creating a fundamental condition for otherwise competing server units to take an interest in being connected to the control server.

In yet other embodiments, the fourth instruction preferably comprises an instruction to show the information shown from the selected server unit in a new window on the display. This solution is advantageous, in particular as it does not affect the previous window on the display and the new window is easy to close if the information shown is not desirable.

In still other embodiments, addresses of a plurality of server units, which must contain mutually related information, are preferably put together in the control server as a cluster, from which the control server selects a server unit. Thus, it is possible, in a rapid and very simple manner, to pass on a visiting user computer from one server unit, which includes a certain type of information, to a next server unit, which includes related information.

BRIEF DESCRIPTION OF THE DRAWINGS

The objects and advantages of the invention will be understood by reading the following detailed description in conjunction with the drawings in which.

DETAILED DESCRIPTION

Figure 1:
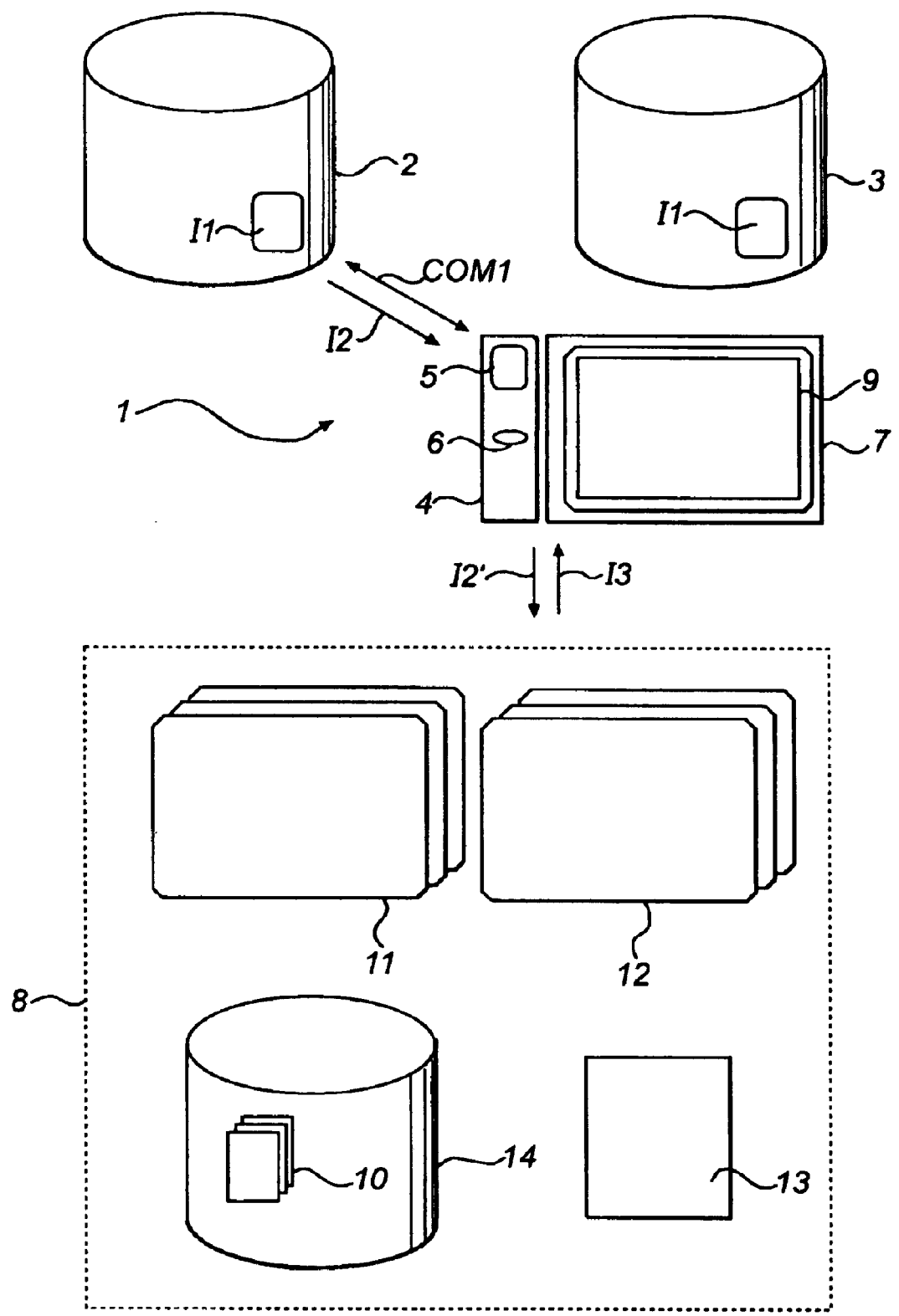
FIGS. 1 and 2 schematically show parts of a data network, and the flow of information between those data network parts in accordance with exemplary embodiments of the invention.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An object of a preferred embodiment of the invention is to build a service, by means of which commercial web sites, which are part of a data network, for example the Internet, can almost double the traffic they would otherwise have without the service. The traffic increase should comprise visitors from a desired target group, i.e., those who have shown an interest in that which is offered by a web site.

Figure 2:
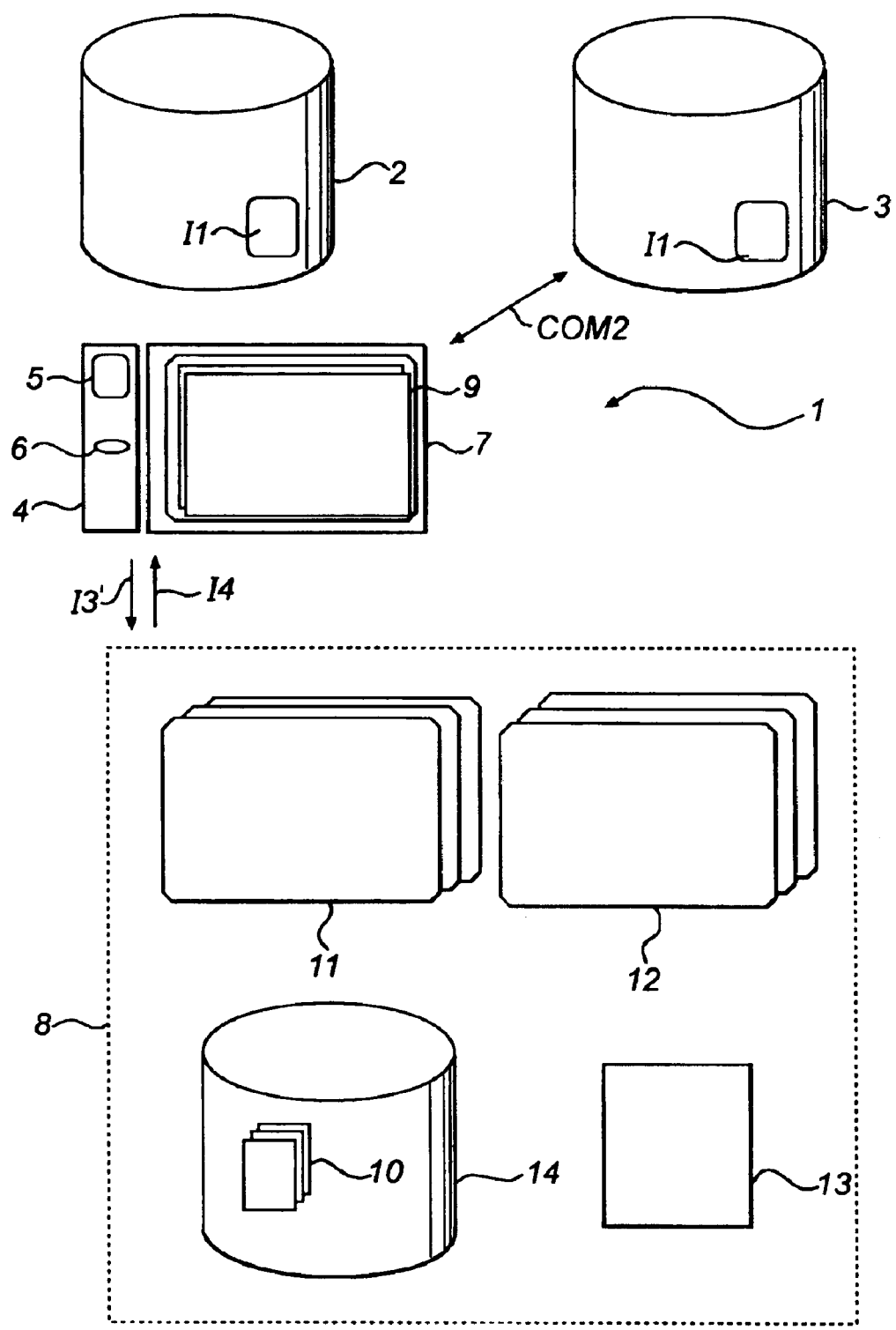

An overview of the invention will now be described with reference to FIGS. 1 and 2, which schematically show parts of a data network, and the flow of information between those data network parts in accordance with exemplary embodiments of the invention. It should be understood that throughout the description and the claims, the term "instruction" is generally used to refer to any form of computer-understandable structure for controlling the operation of the computer, such as a single machine language instruction, or alternatively a collection of such instructions, such as a Java script. Referring now to the figures, a data network 1, such as the Internet, is depicted. To control information flow in accordance with the invention, a control server 8 is provided, to which first and second units 2, 3 are linked by means of a first instruction I1. The first instruction I1 contains conditions for contacting the control server 8. A user computer 4 visits, say, the first server unit 2 and retrieves information from the first server unit 2 via communication link COM1. The retrieved information may be stored in a memory (not shown) of the computer. The stored information may be retrieved and presented to a user by means of a display 7, connected to the user computer 4. When the conditions specified by the first instruction I1 are satisfied, the first server unit 2 sends a second instruction I2 to the user computer 4. The second instruction I2 contains information intended for the control server 8. Receipt of the second instruction I2 causes the user computer 4 to contact the control server 8 for the purpose of sending information I2' to the control server 8. In response, the control server 8 sends a third instruction I3 to the user computer 4, which third instruction I3 contains conditions for renewed contacting of the control server 8. The third instruction I3 causes the user computer 4, when the last-mentioned conditions are satisfied, to send a request I3' to the control server 8 to control the information flow. The control server 8 then sends a fourth instruction I4 to the user computer 4 in response to this request when predetermined conditions are satisfied. The fourth instruction I4 causes the user computer 4 to contact, for information exchange, the second server unit 3, which has been selected by the control server 8 according to fixed rules. Having made contact with the second server 3, the user computer 4 fetches information from this selected server unit and stores the information in the memory to show the same on its display 7.

The invention will now be described in greater detail, making further reference to FIGS. 1 and 2. In order to achieve the service by which web sites (represented as first and second servers 1, 2) can increase their traffic flow, the participating web sites modify their so-called HTML pages such that visitors, who do not convert, i.e., do not buy anything, register themselves, open an account, and the like, are under certain conditions offered another related web site as they leave the web site.

To make various web sites choose to connect to the service, the participating web sites may be offered the possibility of laying down conditions on which another related web site is to be offered to the user computer 4. Alternatively, or in addition, web sites may be offered the possibility of being informed by statistics about the increase in visitors who come from other web sites, and in visitors who are sent to other web sites.

In this connection, a visitor is a person who visits a certain web site by means of a computer and thus shows an interest in a certain subject. When visiting a web site, the computer fetches a minimal Java script I2, whose only function is to fetch a longer script I3 from a traffic control server, to which the operator of the invention has access.

The script I3 that is delivered to the user computer's browser is adapted to the information I2' that is sent from the user computer 4 to the control computer 8 (e.g., SID, referring document and possibly cookies). Depending on the status of the web site in the control server 8, an empty script or a script which does not open a new window can be delivered.

A web site cookie is created by the web site in question when the web site wants to exclude a certain visitor from the control server 8. Since the cookie is set by the web site, only the web site is able to read it. This, in turn, makes it necessary for the Java script which is served by the control server 8 to know the syntax, read the cookie and on the basis thereof decide whether a proposal is to be shown or not.

A first cookie 5 is set at a first contact with the control server (the Java script server). The first cookie 5 is persistent, i.e., it lives forever unless it is removed by the user. The content is only a unique identifier (e.g., an integer).

Yet another cookie (e.g., a second cookie 6) is set when an alternative is shown to the user. The lifetime of the second cookie 6 is set to a predetermined period of time, such as 30 minutes, and during this time no new alternative web sites will be shown to the user computer 4.

In the exemplary embodiment that uses the Internet, web sites that are involved in the method must modify the so-called BODY tag in the HTML documents that include the scripts for calling a function when leaving the page.

A group of web sites in one and the same niche are put together as a cluster, in which other web sites are, according to fixed rules, suggested to visitors leaving the web site. Thus, a customer of the control server 8 is always a web site participating in a cluster.

In an exemplary embodiment, the control server comprises three main parts, namely a script sending part 11, a bounce sending part 12 and a support part 13. The control server 8 communicates with a database 14, in which all data 10 is stored. The database may or may not be considered part of the control server 8.

The script sending 11 part delivers the Java scripts to the web sites included in the various clusters.

The bounce sending part 12 ensures that a web site gets exactly as much traffic back as it sends into a cluster. When a new window 9 is opened, a request is passed on to the bounce sending part 12 which quickly picks out the address of the web site which is to be opened in the new window 9.

The support part 13 is the interface with the users of the control server, both on the customer and the provider side.

The person skilled in the art will understand that the terminology used in the above description is based on the described Internet application, whereas the terminology used in the introduction and the claims is chosen with a view to not limiting the invention to such an application. Thus, the inventive method may very well also be used in other data networks and in telecommunication networks, in which alternative services are accessible via a display of a telephone.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in anyway. The scope of the invention is given by the appended claims, rather than the preceding description, and all variations and equivalents which fall within the range of the claims are intended to be embraced therein.

What is claimed is:

1. A method of controlling an information flow in a digital network, which comprises a plurality of server units, which for information exchange are visitable by at least one user computer that is connected to the digital network and has a program that controls contact with the server units of the network, and a memory, in which information fetched from the server units is stored to be shown on a display connected to the user computer, the method comprising:

providing a control server, to which some of the server units are linked via digital the network by storing a first instruction in them, wherein the first instruction contains conditions for contacting the control server;

a first server unit that is visited by the user computer and linked to the control server sending a second instruction to the user computer when the conditions for contacting are satisfied, wherein the second instruction contains information intended for the control server;

in response to said second instruction, the user computer contacting the control server for sending the information to the control server;

the control server sending a third instruction to the user computer, wherein the third instruction contains conditions for renewed contacting of the control server;

in response to the third instruction, the user computer sending a request to the control server to control the information flow when said conditions for renewed contacting of the control server are satisfied;

the control server sending a fourth instruction to the user computer in response to the request to control the information flow when predetermined conditions are satisfied;

in response to the fourth instruction, the user computer contacting a second server unit for information exchange, wherein the second server unit is selected by the control server according to fixed rules; and the user computer fetching information from the second server unit and storing the information in the memory.

2. A method as claimed in claim 1, wherein as a condition for contacting the control server, the condition that the user computer interrupts in an undesirable manner the contact with a visited server unit is integrated in said first instruction.

3. A method as claimed in claim 1, wherein as a condition for contacting the control server, the condition that the user computer interrupts in a desirable manner the contact with a visited server unit is integrated in said first instruction.

4. A method as claimed in claim 1, wherein address information about the visited server unit is integrated in the information which is included in said second instruction.

5. A method as claimed in claim 1, wherein as a condition for renewed contacting of the control server, a time condition, which for a predetermined time inhibits renewed contacting of the control server, is integrated in said third instruction.

6. A method as claimed in claim 1, wherein said second instruction includes information about a behavior of the user computer in the visited server unit; and further comprising the step of including, in said request to control the information flow, the information about the behavior of the user computer in the visited server unit.

7. A method as claimed in claim 1, wherein the condition that a server unit linked to the control server is selected no more often than said server unit causes the sending of a request to control the information flow to the control server is integrated in said fixed rules.

8. A method as claimed in claim 1, wherein said fourth instruction comprises an instruction to show the information shown from the selected server unit in a new window on the display.

9. A method as claimed in claim 1, wherein in the control server, addresses of a plurality of server units, which must contain mutually related information, are put together as a cluster, from which the control server selects a server unit.

10. A method of controlling an information flow in a digital network that comprises a control server, a first web site server and a second web site server, the method comprising:

storing a first instruction in the first web site server, wherein the first instruction includes conditions for contacting the control server;

in response to satisfaction of the conditions for contacting the control server, sending a second instruction from the first web site server to a user computer, wherein the second instruction includes information intended for use by the control server;

in response to the second instruction, the user computer contacting the control server and sending to the control server the information intended for use by the control server;

in response to the information intended for use by the control server, the control server sending a third instruction to the user computer, wherein the third instruction includes conditions for renewed contacting of the control server;

in response to satisfaction of the conditions for renewed contacting of the control server, the user computer sending a request to the control server, wherein the request is a request to control the information flow;

in response to the request to control the information flow, the control server using fixed rules to select the second web site server, and sending a fourth instruction to the user computer that will cause the user computer contact the second web site server; and in response to the fourth instruction, the user computer contacting the second web site server.

11. A method as claimed in claim 10, wherein said first instruction includes a condition for contacting the control server, wherein said condition for contacting the control server is the condition that the user computer interrupts contact with the first web site server without converting.

12. A method as claimed in claim 10, wherein said first instruction includes a condition for contacting the control server, wherein said condition for contacting the control server is the condition that the user computer interrupts contact with the first web site server with converting.

13. A method as claimed in claim 10, wherein said information intended for use by the control server that is included in the second instruction includes address information about the first web site server.

14. A method as claimed in claim 10, wherein as a condition for renewed contacting of the control server, a time condition, which for a predetermined time inhibits renewed contacting of the control server, is integrated in said third instruction.

15. A method as claimed in claim 10, wherein said second instruction includes information about a behavior of the user computer in the first web site server;

and further comprising the step of including, in said request to control the information flow, the information about the behavior of the user computer in the visited server unit.

16. A method as claimed in claim 10, wherein said fixed rules include a condition that a candidate web server linked to the control server is selected no more often than the candidate server causes the sending of a request to control the information flow to the control server.

17. A method as claimed in claim 10, wherein said fourth instruction comprises an instruction to show the information shown from the selected server unit in a new window on display that is connected to the user computer.

18. A method as claimed in claim 10, wherein in the control server, addresses of a plurality of web servers that contain mutually related information stored together as a cluster, from which the control server selects a web server.

19. A computer readable medium, having a program recorded thereon, wherein the program makes computers in a digital network execute a procedure to control an information flow in the digital network, wherein the digital network comprises a control server, a first web site server and a second web site server, the procedure comprising:

storing a first instruction in the first web site server, wherein the first instruction includes conditions for contacting the control server;

in response to satisfaction of the conditions for contacting the control server, sending a second instruction from the first web site server to a user computer, wherein the second instruction includes information intended for use by the control server;

in response to the second instruction, the user computer contacting the control server and sending to the control server the information intended for use by the control server;

in response to the information intended for use by the control server, the control server sending a third instruction to the user computer, wherein the third instruction includes conditions for renewed contacting of the control server;

in response to satisfaction of the conditions for renewed contacting of the control server, the user computer sending a request to the control server, wherein the request is a request to control the information flow;

in response to the request to control the information flow, the control server using fixed rules to select the second web site server, and sending a fourth instruction to the user computer that will cause the user computer contact the second web site server; and in response to the fourth instruction, the user computer contacting the second web site server.

* * * * *

UNITED STATES PATENT AND TRADEMARK OFFICE
CERTIFICATE OF CORRECTION

PATENT NO. : 6,912,583 B2 Page 1 of 1
DATED : June 28, 2005
INVENTOR(S) : Jonas Hollander It is certified that error appears in the above-identified patent and that said Letters Patent is hereby corrected as shown below:

Column 6,
Delete line 22, and insert:
-- units are linked via the digital network by storing a first --.

Signed and Sealed this

Eleventh Day of October, 2005

JON W. DUDAS
*Director of the United States Patent and Trademark Office*